United States Patent [19]

Mizutani et al.

[11] 4,202,718
[45] May 13, 1980

[54] METHOD OF AND APPARATUS OF MANUFACTURING A FIBER-REINFORCED PRESSURE HOSE

[75] Inventors: Tadashi Mizutani, Osaka; Hiromichi Tachibana, Ogaki, both of Japan

[73] Assignee: Kuraray Plastics, Co., Ltd., Osaka, Japan

[21] Appl. No.: 857,909

[22] Filed: Dec. 6, 1977

[30] Foreign Application Priority Data

Dec. 9, 1976 [JP] Japan .............................. 51-148978

[51] Int. Cl.$^2$ .......................................... B65H 81/00
[52] U.S. Cl. .................................. 156/171; 156/173; 156/244.12; 156/244.13; 156/431
[58] Field of Search ............... 156/149, 148, 173, 175, 156/172, 170, 393, 392, 428, 430, 431, 432, 244.13, 244.12, 500, 143; 264/103, 173; 425/114, 113; 242/156, 7.21

[56] References Cited

U.S. PATENT DOCUMENTS

| | | | |
|---|---|---|---|
| 3,038,523 | 6/1962 | Merck et al. .......................... | 156/393 |
| 3,112,234 | 11/1963 | Krupp .................................... | 156/169 |
| 3,156,600 | 11/1964 | Fontaine ............................... | 425/113 |
| 3,274,316 | 9/1966 | Songer .................................. | 156/144 |
| 3,341,387 | 9/1967 | Boggs ................................... | 156/175 |
| 3,692,448 | 9/1972 | Menasoff .............................. | 425/113 |
| 3,707,415 | 12/1972 | Golladay et al. ..................... | 156/169 |
| 3,769,127 | 10/1973 | Goldsworthy et al. .............. | 156/172 |
| 3,894,901 | 7/1975 | Breher ................................. | 156/244.13 |
| 3,905,853 | 9/1975 | Stent ..................................... | 156/431 |
| 3,983,313 | 9/1976 | Ney et al. .............................. | 174/113 R |

*Primary Examiner*—Michael W. Ball
*Attorney, Agent, or Firm*—Barry Kramer

[57] ABSTRACT

An apparatus for manufacturing a fiber-reinforced pressure hose comprises a spiral winder which includes a mandrel of a truncated conical shape tapering one end towards the other end thereof at a predetermined angle of convergence and having its outer peripheral surface formed with a plurality of guide grooves lengthwise thereof. Longitudinal reinforcing strands are guided along the guide grooves on the mandrel while at least two circumferential reinforcing strands are spirally wound on the longitudinal reinforcing strands in the opposed direction with each other to form a tubular reinforcing layer. This reinforcing layer is, while being drawn in a direction away from the mandrel, positioned substantially intermediately of the wall of the subsequently formed tubular product.

27 Claims, 13 Drawing Figures

METHOD OF AND APPARATUS OF MANUFACTURING A FIBER-REINFORCED PRESSURE HOSE

BACKGROUND OF THE INVENTION

The present invention relates to the manufacture of a fiber-reinforced pressure hose of a type having a fiber reinforcement embedded in the resinous material of the wall of the tubular product or between inner and outer tubular layers and, more particularly, to a method of and an appratus for manufacturing the fiber-reinforced pressure hose of the type referred to above.

The manufacture of a fiber-reinforced pressure hose, such as flexible pipe or flexible hose, has heretofore been carried out by winding reinforcing strands spirally on an outer peripheral surface of an inner tube of natural or synthetic rubber or plastic material to form a reinforcing layer and then extruding the natural or synthetic rubber or plastic material onto the reinforcing layer externally of the inner tube to form an outer tube which is integrally bonded to the inner tube through interstices of the spirally wound reinforcing strands forming the reinforcing layer. In this method of manufacturing the fiber-reinforced, flexible pressure hose, since the reinforcing strands are spirally wound directly on the outer peripheral surface of the inner tube, the spirally wound reinforcing strands tend to impart a tightening force on the inner tube to such an extent that the inner tube is radially inwardly stressed. Adjustment of the tension of the individual reinforcing strands prior to the latter being spirally wound on the inner tube would obviate the possibility of generation of the undesirable tightening force, however, it is very difficult with the method of the type described above.

There is also known another conventional method which substantially eliminates the above described drawback and wherein a fiber-reinforced, flexible pressure hose is manufactured by supplying a plurality of longitudinal reinforcing strands onto an elongated mandrel and in equally spaced relation to each other circumferentially of the mandrel and, simultaneously therewith, winding at least two circumferential reinforcing strands on the mandrel spirally in the opposite directions with each other so as to cross over the longitudinal reinforcing strands, thereby forming a reinforcing layer, drawing the reinforcing layer out of the mandrel, and extruding a natural or synthetic rubber or thermoplastic material internally and externally of the reinforcing layer to form the fiber-reinforced, flexible hose at a point of separation of the reinforcing layer from the leading end of the mandrel in terms of the direction of movement of the reinforcing layer being drawn.

In this conventional method, the reinforcing layer, composed of the longitudinal reinforcing strands and the circumferential reinforcing strands spirally wound around the longitudinal reinforcing strands, is slipped off from the mandrel as it is drawn in a direction away from the mandrel. In order for the reinforcing layer to be withdrawn out of the mandrel, a relatively great drawing force is required to draw the reinforcing layer in the direction away from the mandrel because the spirally wound, circumferential reinforcing strands imposes a tightening force on the longitudinal reinforcing strands thereby pressing the latter tight to the outer peripheral surface of the mandrel.

Moreover, in the conventional method, the reinforcing strands, when oppositely spirally wound onto the longitudinal reinforcing strands on the mandrel, tend to be irregularly displaced and, also, one or more of the longitudinal reinforcing strands tend to be twisted and/or slackened. Therefore, the resultant fiber-reinforced pressure hose manufactured according to the above described conventional method is such that the reinforcing layer embedded in the natural or synthetic rubber or plastic material is not uniformly developed over the entire length of the hose to such an extent that the pressure withstanding performance and the flexibility vary at local points on the length of hose and/or the hose tends to be twisted and/or meandered.

SUMMARY OF THE INVENTION

Accordingly, the present invention has been developed in view to substantially eliminating the above described disadvantages and inconveniences inherent in the conventional method and is intended to provide an improved apparatus for manufacturing a fiber-reinforced pressure hose having a reinforcing layer uniformly developed over the entire length of hose with no substantial displacement in arrangement of reinforcing strands.

Another object of the present invention is to provide an improved apparatus of the type referred to above, wherein means for adjusting the tension of any one of the longitudinal reinforcing strands is provided for ultimately forming the reinforcing layer which, when embedded in the wall of the resultant hose does not result in twisting and/or meandering of the resultant hose.

A further object of the present invention is to provide an improved apparatus of the type referred to above, which does not require a relatively great drawing force to draw the hose being manufactured continuously and which enables the hose to be manufactured at a relatively high speed.

According to the present invention, in order to form a reinforcing layer which is ultimately positioned in the wall of the resultant hose at a position substantially intermediately of the thickness of the wall forming the hose, a plurality of longitudinal reinforcing strands are passed over and in contact with an outer peripheral surface of an elongated mandrel in a direction parallel to the longitudinal axis of the mandrel and in circumferentially equally spaced relation to each other. Simultaneously therewith, at least two circumferential reinforcing strands are spirally wound onto the mandrel in the opposite directions with each other so as to cross over the longitudinal reinforcing strands. While the formation of the reinforcing layer in the manner so far described above is well known, the present invention makes use of the mandrel of a construction wherein the body is tapered towards one of the opposed ends on the leading side with respect to the drection of advance or drawing of the hose being manufactured, thereby substantially representing a shape of a truncated cone, and wherein a plurality of longitudinal guide grooves, the number of said guide grooves being substantially equal to or greater than the number of the longitudinal reinforcing strands employed, are defined on the outer peripheral surface of the mandrel in a direction longitudinally of the mandrel for guiding the longitudinal reinforcing strands without allowing the latter to be displaced laterally of the direction of advance of the longitudinal reinforcing strands.

Because of the employment of the substantially truncated-conical mandrel of the particular construction as hereinabove described, the possibility that the longitudinal reinforcing strands are forced to tightly contact the outer peripheral surface of the mandrel when the circumferential reinforcing strands are subsequently wound therearound can advantageously be eliminated and, therefore, the reinforcing layer can be formed with no twisting and/or meandering occurring in it.

It is a related object of the present invention to provide a method of manufacturing the hose of the type referred to above.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE EMBODIMENTS

Figure 1:
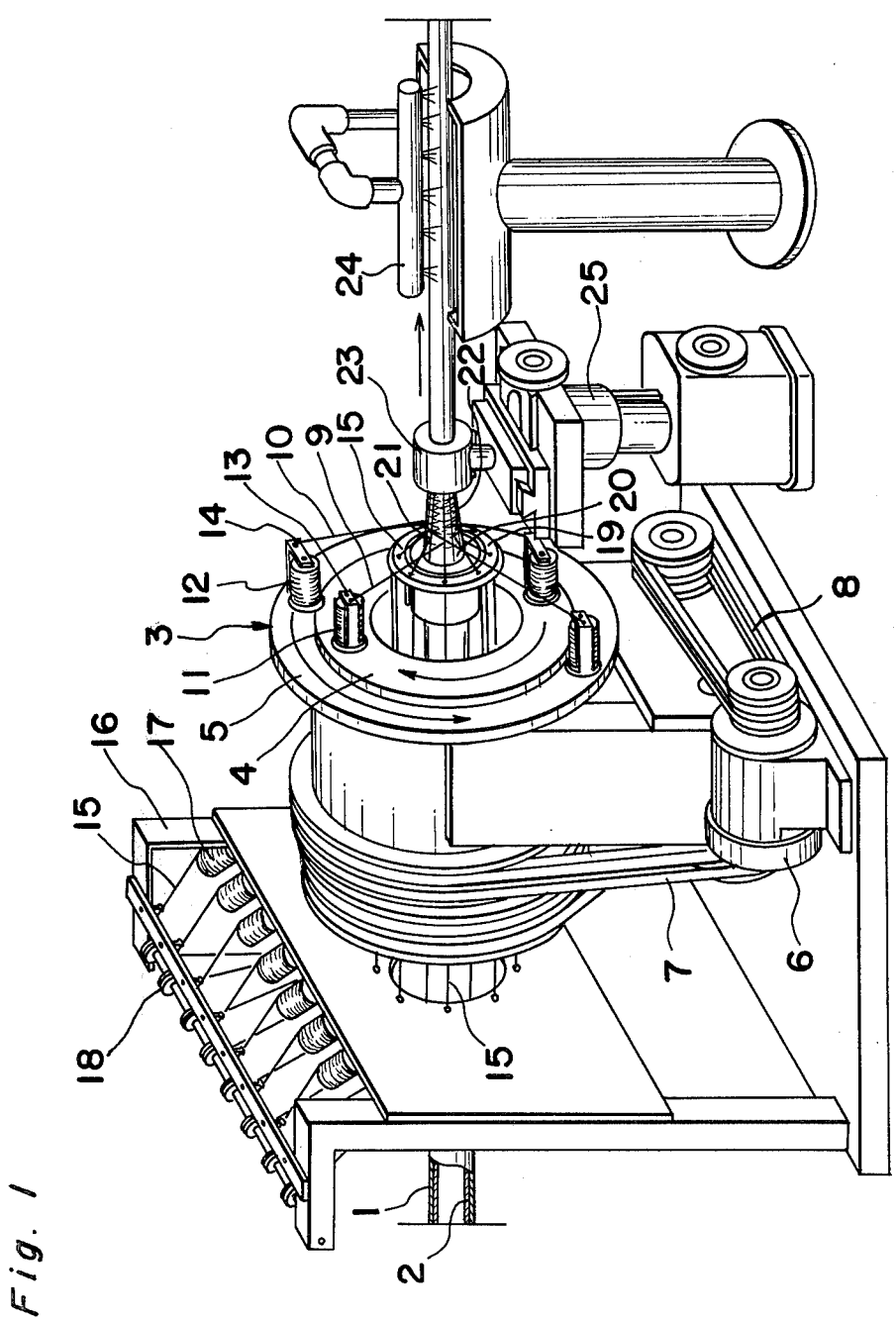
FIG. 1 is a schematic perspective view of an apparatus embodying the present invention.
Figure 2:
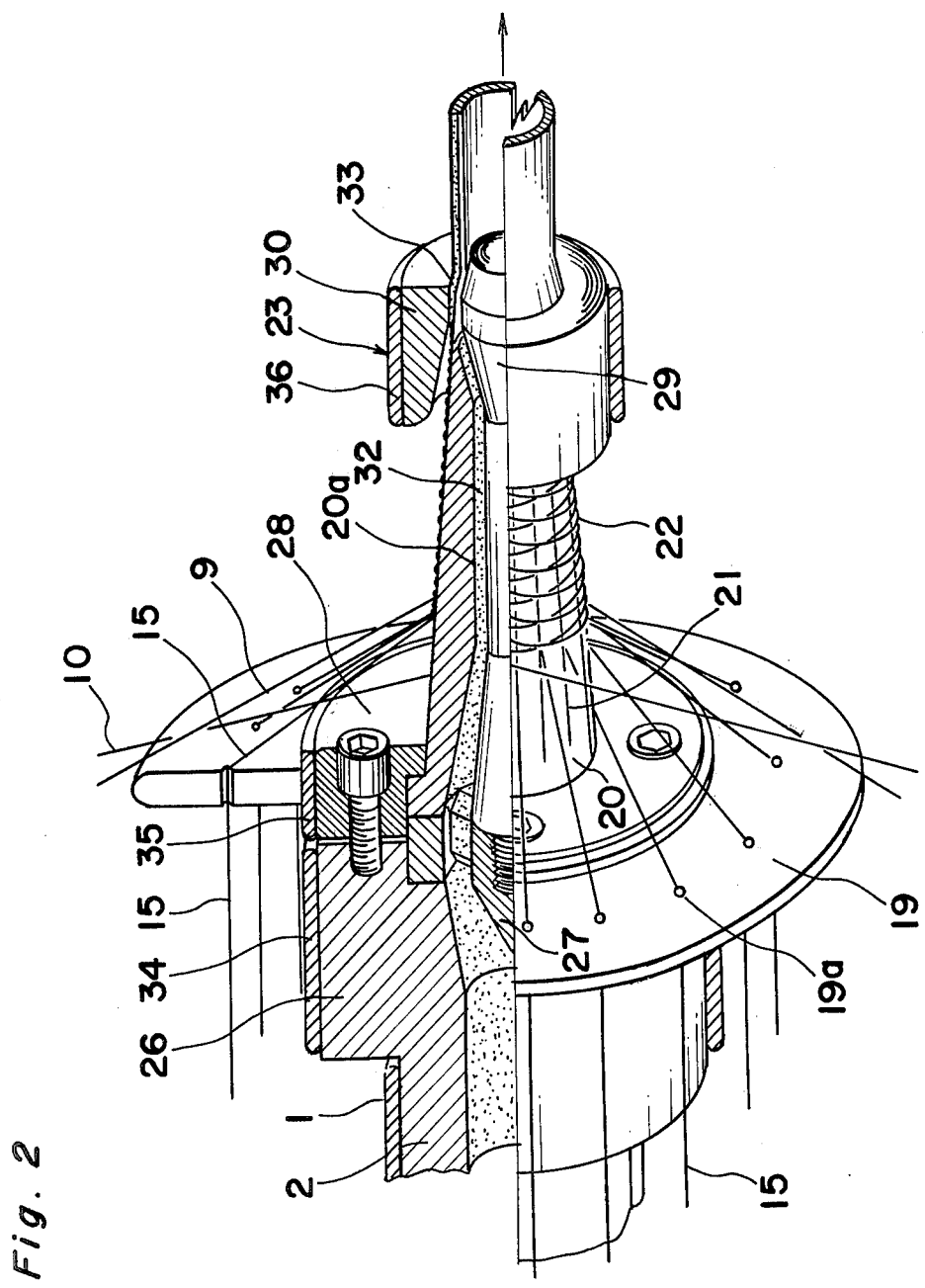
FIG. 2 is a perspective view, on an enlarged scale, of an essential portion of the apparatus shown in FIG. 1, with a portion broken away.

Referring first to FIGS. 1 and 2, an apparatus for manufacturing a fiber-reinforced pressure hose comprises a cylindrical hollow guide pipe 2 having one end coupled to an extruder (not shown) of any known construction for supplying a molten rubber or thermoplastic material under pressure through the guide pipe 2 and the other end freely extending through a spiral winder 3 of a construction as will be described later.

A substantially intermediate portion of the guide pipe 2 is to be understood as heated by any suitable heating device to avoid any possible premature solidification of the molten material being supplied under pressure through the guide pipe 2 towards the free end of the guide pipe 2. So far as illustrated, the heating device is shown in the form of a band heater 1 surrounding the outer peripheral surface of the guide pipe 2.

The spiral winder 3 comprises a pair of coaxially arranged annular rotary supports 4 and 5, one inside the other, which are adapted to be rotated in the directions opposite to each other by a drive unit 6, for example, an electrically operated motor, through respective transmission systems 7 and 8, each of which systems 7 and 8 may be in the form of a substantially endless belt, a substantially endless chain or a train of transmission gears although the transmission system 7 or 8 is shown as constituted by a substantially endless belt in the illustrated embodiment. Each of the annular rotary supports 4 and 5 carries a plurality of, for example, two, bobbins 11 or 12 rotatably supported thereby by means of respective bobbin holders 13 or 14, each of said holders 13 or 14 being of a construction that a reinforcing strand spirally wound on the associated bobbin 11 or 12 can be drawn therefrom towards a mandrel 20, as will be described later, under an appropriately controlled tension.

The apparatus further comprises a creel 16 positioned rearwardly of the spiral winder 3 and supporting a plurality of bobbins 17 from which longitudinal reinforcing strands 15 are respectively drawn towards the mandrel 20 by way of a tension adjusting device 18 for adjusting the tension of the individual longitudinal reinforcing strands 15 being passed therethrough. As best shown in FIG. 2, portions of the respective longitudinal reinforcing strands 15, which pass through the spiral winder 3, particularly, inside the annular rotary support 4, extend through axial holes 19a defined in a balance ring 19, stationarily held in position, in a substantially circular configuration coaxial with the center of the balance ring 19 and are, then, deflected towards the mandrel 20 of a construction which will now be described with particular reference to FIG. 2.

The mandrel 20 is of a substantially truncated-conical shape and has a relatively larger diameter end coupled to the free end of the guide pipe 2 by means of a cap member 28 secured through a plurality of set screws or bolts to a radially outwardly extending flange 26 which is integrally formed, or otherwise rigidly connected, with the free end of the guide pipe 2. The mandrel 20 has an axial bore 20a extending over the entire length thereof in alignment with the longitudinal axis of said mandrel 20, within which an elongated core member 27 is accommodated with its peripheral surface spaced from the inner peripheral surface of the mandrel 20. To keep the core member 27 in position within the bore 20a of the mandrel 20, the core member 27 may be of a construction having one end adjacent the larger diameter end of the mandrel 20 formed with a plurality of radially outwardly extending arms which are in turn engaged to the inner peripheral surface of either the flange 26 or the mandrel 20. However, the mandrel 20 with the core member 27 therein so far described may be of any suitable construction known to those skilled in the art.

The core member 27 so supported within the bore 20a of the mandrel 20 has the other end integrally formed, or rigidly connected, with a substantially barrel-shaped male die 29, a free end portion of which is situated outside of the bore 20a of the mandrel 20.

With the mandrel 20 so constructed, it will readily be seen that an annular passage 32 extending over the entire length of the mandrel 20 and having one end in communication with the guide pipe 2 is defined between the peripheral surface of the core member 27 and the inner peripheral surface of the mandrel 20, through which passage flows the molten material from the guide pipe 2 towards the male die 29 in a substantially tubular form.

Cooperative with the male die 29 is a female die 30 of a substantially cylindrical shape having a tapering bore and is supported in position in such a manner that a relatively larger diameter end portion of the tapering bore of the female die 30 is held in position to cover the free end portion of the mandrel 20 while a relatively smaller diameter end portion of the same tapering bore, opposed to the larger diameter end portion thereof, of the female die 30 is held in position to cover the outwardly protruding end portion of the male die 29 with an annular orifice 33 defined therebetween.

As best shown in FIG. 1, the male and female dies 29 and 30 form respective parts of the shaping device 23 which also includes a positioning mechanism 25. This positioning mechanism 25 is so designed as to support the female die 30 in alignment with the longitudinal axis of the mandrel 20 and also as to adjust the position of the female die 30 relative to the male die 29 so that the orifice 33 can be enlarged or decreased depending upon the desired thickness of the wall forming the ultimately manufactured tubing.

As best shown in FIG. 2, as one of essential features of the present invention, the mandrel 20 has an outer peripheral surface formed with a plurality of guide grooves 21 equally spaced from each other circumferentially of said mandrel 20 and extending lengthwise of said mandrel 20, the number of said guide grooves 21 being equal to or greater than the number of the longitudinal reinforcing strands 15 employed. In order for the successive portions of the respective reinforcing strands 15 to be engaged in the associated guide grooves 21 on the mandrel 20 during formation of a substantially tubular reinforcing layer 22 as will be described later, the guide grooves 21 are preferably aligned in position with the axial holes 19a in the balance ring 19.

At the outset of operation of the apparatus embodying the present invention, respective free end portions of the reinforcing strands 9, 10 and 15 are engaged to a drawing mechanism (not shown), positioned on one side of a cooling unit 24 remote from the spiral winder 3, after having been passed through the orifice 33 defined between the dies 29 and 30 of the shaping device 23. Subsequent rotation of the annular rotary supports 4 and 5 in the directions opposite to each other results in spiral winding of the reinforcing strands 9 and 10 in the opposite directions while the reinforcing strands 15, particularly, portions of the reinforcing strands 15 lying above the outer periphery of the mandrel 20, are laid down by the reinforcing strands 9 and 10, being spirally wound, thereby engaging into the associated guide grooves 21. Thereafter, as the strands 9, 10 and 15 are pulled outwards in a direction away from the mandrel 20 by the drawing mechanism referred to above while the annular rotary supports 4 and 5 continue to rotate in the opposite directions with each other, the reinforcing layer 22, composed of the reinforcing strands 15 extending lengthwise of the layer 22 and the reinforcing strands 9 and 10 spirally wound on the reinforcing strands 15, can be formed.

While the reinforcing layer 22 is being formed on the mandrel 20 in the manner as hereinbefore described, the molten material flowing under pressure from the extruder (not shown) through the guide pipe 2 is supplied by way of the annular passage 32 between the inner peripheral surface of the mandrel 20 and the peripheral surface of the core member 27 towards the orifice 33, whereat a portion of the molten material emerges or leaks outwards through interstices defined in the reinforcing layer 22 among the reinforcing strands 9, 10 and 15. More specifically, as the reinforcing layer 22 formed on the mandrel 20 is drawn outwards through the orifice 33 in the shaping device 23 by the drawing mechanism, that portion of the molten material which has leaked outwards through the interstices in the reinforcing layer 22 forms an outer tubular layer surrounding externally of the reinforcing layer 22 while the remaining portion of the molten material forms an inner tubular layer positioned internally of the reinforcing layer 22, said outer and inner tubular layers being integrally connected with the tubular reinforcing layer 22 positioned substantially intermediately therebetween. The pressure hose so formed as it emerges outwards from the orifice 33 is then transported onto the cooling unit 24 where it is cooled, for example, by spraying a cooling liquid medium as shown.

Reference numerals 34, 35 and 36 respectively represent band heaters surrounding externally of the flange 26, of the cap member 28 and of the female die 30.

The apparatus shown in FIGS. 1 and 2 and of the construction as hereinbefore described is so designed that a resinous material selected from the natural or synthetic rubber and thermoplastic materials is, in the molten form, applied at the orifice 33 from a point internally of the reinforcing layer 22 with the molten material supplied from the extruder through the guide pipe 2 by way of the annular passage 32. However, without utilizing the extruder, the guide pipe 2 and the annular passage 32 in the manner described above and shown in the drawings, the shaping device 23 shown may be replaced by a known extruder of a construction wherein the molten material is applied from a point externally of the reinforcing layer 22, such known extruder being disclosed in any one of the U.S. Pat. No. 2,874,411, patented on Feb. 24, 1959, and the British patent specification No. 977,208 published on Dec. 2, 1964.

Figure 3:
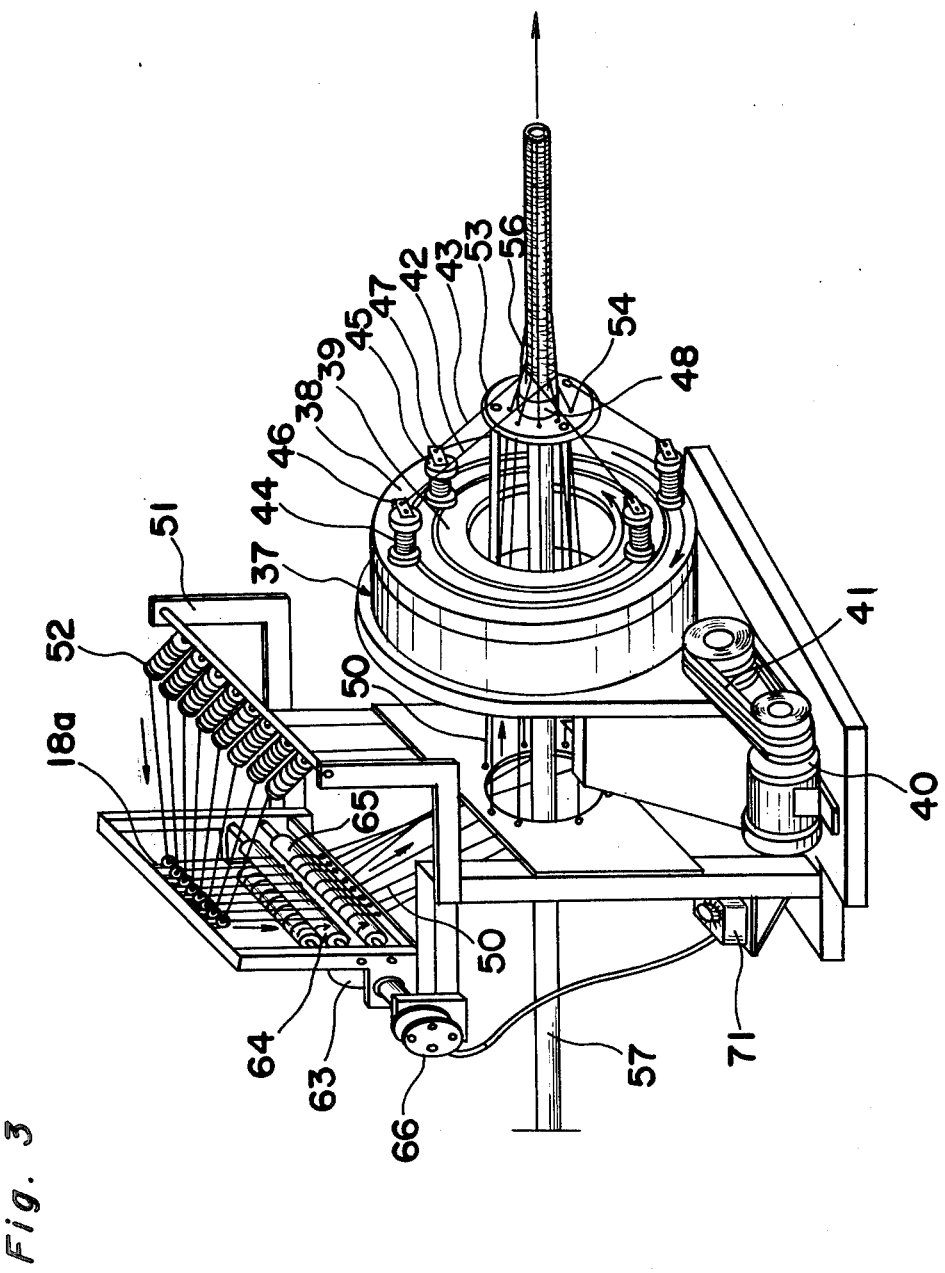
FIG. 3 is a view similar to FIG. 1, showing a modified form of apparatus.
Figure 4:
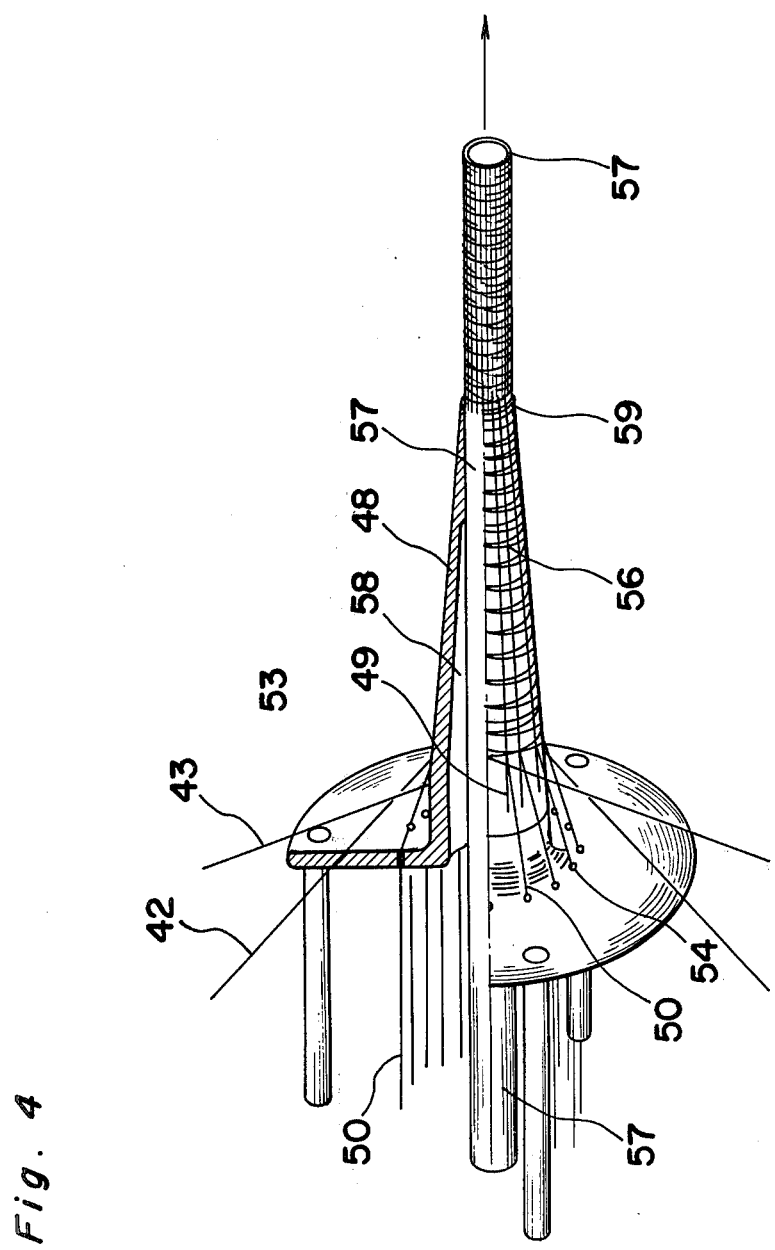
FIG. 4 is a view similar to FIG. 2, showing an essential portion of the modified apparatus of FIG. 3, with a portion broken away.

While the apparatus shown in FIGS. 1 and 2 is of a type wherein the inner and outer tubular layers of the ultimately manufactured pressure hose, which are substantially divided by the tubular reinforcing layer 22 internally and externally of said layer 22, are formed of the molten material from the beginning, the apparatus shown in FIGS. 3 and 4 is of a type wherein only an outer tubular layer is formed on a previously prepared tube with the reinforcing layer mounted thereon, which will now be described with reference to FIGS. 3 and 4.

The apparatus comprises a spiral winder 37 including a pair of coaxially arranged annular rotary supports 38 and 39, one inside the other, which are adapted to be rotated in the directions opposite to each other by a drive unit 40, for example, an electrically operated motor, through a transmission system composed, for example, of substantially endless belts 41 and a train of gears (not shown). Each of the annular rotary supports 38 and 39 carries a plurality of, for example, two bobbins 44 or 45 rotatably supported thereby by means of respective bobbin holders 46 or 47, each of said bobbin holders 46 and 47 on respective annular rotary supports 38 and 39 being of a construction that a reinforcing strand spirally wound on the associated bobbin 44 or 45 can be drawn therefrom towards a mandrel 48, as will be described later, under an appropriately controlled tension.

The apparatus further comprises a creel 51 positioned rearwardly of the spiral winder 37 and supporting a plurality of bobbins 52 from which longitudinal reinforcing strands 50 are respectively drawn towards the mandrel 48 by way of a tension adjusting device 18a for adjusting the tension of the individual longitudinal reinforcing strands 50 being passed therethrough. As best shown in FIG. 4, portions of the respective longitudinal reinforcing strands 50, which pass through the spiral winder 37, particularly, inside the annular rotary support 39, extend through axial holes 54 defined in a balance ring 53, held in position as will be described later, in a substantially circular configuration coaxial with the center of the balance ring 53 and are, then deflected towards the mandrel 48 of a construction which will now be described with particular reference to FIG. 4.

The mandrel 48 is of a substantially truncatedconical shape and has a relatively larger diameter end integrally formed with the balance ring 53 which is in turn supported in position by a plurality of support rods extending from and rearwardly of the balance ring 53 in a direction away from the mandrel 48. The mandrel 48 has an axial bore 58 extending over the entire length thereof in alignment with the longitudinal axis of said mandrel 48, through which an elongated tube 57, which has previously been prepared of a natural or synthetic rubber material is transported in one direction towards a relatively smaller diameter end, that is, a front free end 59, of the mandrel 48.

As is the case with the mandrel 20 shown in FIGS. 1 and 2, the mandrel 48 has an outer peripheral surface formed with a plurality of guide grooves 49 equally spaced from each other circumferentially of said mandrel 48 and extending lengthwise of said mandrel 48, the number of said guide grooves 49 being equal to or greater than the number of the longitudinal reinforcing strands 50 employed. In order for the successive portions of the respective reinforcing strands 50 to be engaged in the associated guide grooves 49 on the mandrel 48 during formation of a substantially tubular reinforcing layer 56 as will be described later, the guide grooves 49 are preferably aligned in position with the axial holes 54 in the balance ring 53.

It will readily be seen that the reinforcing layer 56 can be formed in a manner similar to formation of the reinforcing layer 22 as described with reference to FIGS. 1 and 2 while the annular rotary supports 38 and 39 are rotated in the opposite directions with each other to wound the circumferential reinforcing strands 42 and 43 on the circumferentially equally spaced longitudinal reinforcing strands 50 on the mandrel 48.

While the reinforcing layer 56 is so formed on the mandrel 48 and drawn outwards in a direction away from the mandrel 48 past the front free end 59 of the mandrel by a drawing mechanism (not shown), the reinforcing layer 56 can be mounted on the previously manufactured tube 57 as it parts from the front end 59 of the mandrel 48. The tube 57 with the reinforcing layer 56 thereon is further transported towards an extruding or tubing machine (not shown) where a molten natural or synthetic rubber or plastic material is applied externally of the reinforcing layer 56 on the tube 57 to form an outer tubular covering which are integrally bonded to the outer peripheral surface of the tube 57 through interstices defined in the reinforcing layer 56 among the reinforcing strands 42, 43 and 50. It is to be noted that the extruding or tubing machine referred to above may be installed wither at a position adjacen the spiral winder 37 so that the manufacture of the tubing can be continuously performed, or at a position remote from the position where the spiral winder 37 is installed. In other words, the tube 57 with the reinforcing layer 56 mounted thereon at a position adjacent the free end 59 of the mandrel 48 may be transported to the extruding or tubing machine either immediately after it leaves the spiral winder 37, or after it has temporarily stored at any suitable location.

In the apparatus shown in and described with reference to FIGS. 3 and 4, the reinforcing layer 56 is preferably bonded to the outer peripheral surface of the previously manufactured tube 57 prior to the molten material being applied thereto, in order to avoid any possible displacement of the reinforcing layer 56 in a direction laterally and axially of the length of the layer 56. For this purpose, as shown in FIG. 5, a bonding agent applicator may be employed, which will now be described with reference to FIG. 5.

Figure 5:
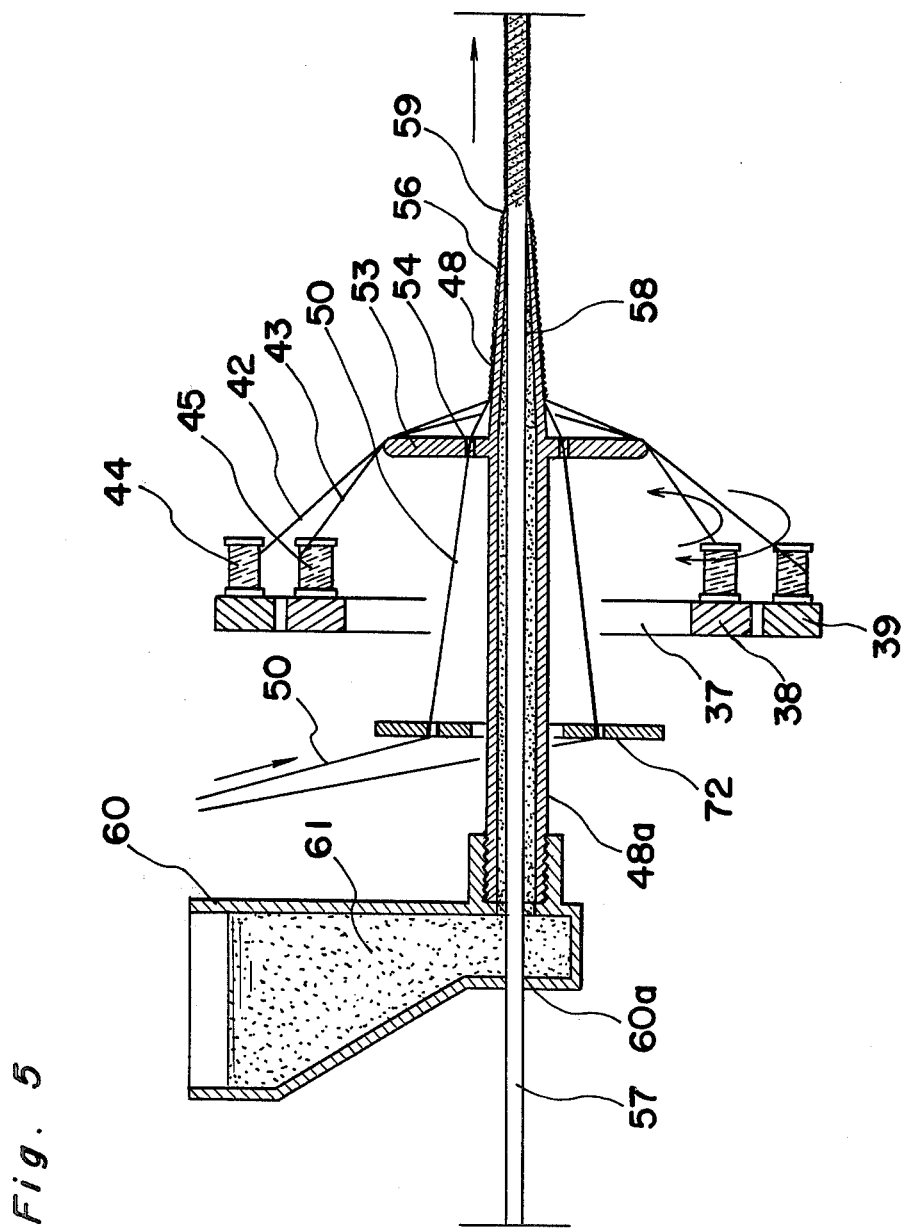
FIG. 5 is a longitudinal sectional view of a mandrel combined with a bonding agent applicator, which may be employed in the modified apparatus shown in FIG. 3.

It is to be noted that, for the sake of brevity, the same reference numerals are used in FIG. 5 as in FIGS. 3 and 4 where the same elements are referred to.

Referring now to FIG. 5, the bonding agent applicator comprises a substantially hopper-like container 60 supported in position rearwardly of the balance ring 53 in terms of the direction of transportation of the ultimately manufactured hose and having a portion adjacent the bottom thereof formed with a supply port coaxial with the axial bore 58, the supply port being communicated to the axial bore 58 of the mandrel 48 by means of an extension 48a which has one end connected to said supply port of the bonding agent applicator and the other end integrally formed with the mandrel 48. The container 60 is also formed with a passage 60a coaxial with and opposed to the supply port.

With the bonding agent applicator so constructed, it is clear that, as the previously manufactured tube 57 is axially moved, in a direction as indicated by the arrow, through the passage 60a and then the supply port into the axial bore 58, a bonding agent 61 accommodated within the tank 60 can be applied on the outer peripheral surface of the tube 57. Accordingly, as the tube 57 with the bonding agent applied thereon emerges outwards from the free end of the mandrel 48, the reinforcing layer 56 being drawn so as to leave from the mandrel 48 can be bonded to the outer peripheral surface of the tube 57 immediately after it has been mounted on the tube 57. In FIG. 5, reference numeral 72 represents a guide member for guiding the longitudinal reinforcing strands 50 supplied from the bobbins 52 so as to extend clear of the bonding agent applicator.

In the apparatus shown in FIGS. 3 and 4, instead of the employment of the extruding or tubing machine referred to above, a taping device of any known construction for winding one or more tapes of synthetic resin material on the tube 57 externally of the reinforcing layer 56 may be employed. In this case, the provision of the bonding agent applicator shown in FIG. 5 in the apparatus of the construction shown in FIGS. 3 and 4 is recommended and, in addition thereto, a heating device would be necessary for heating the synthetic resin tape or tapes to fuse subsequent to the winding of the tape or tapes on the tube 57 externally of the reinforcing layer 56, as is well known to those skilled in the art.

Figure 6:
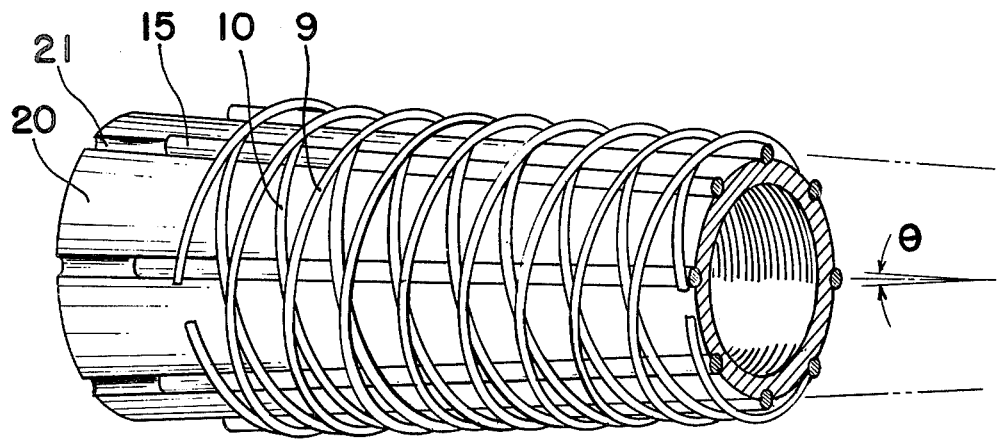
FIG. 6 is a perspective view, on an enlarged scale, showing the details of formation of a reinforcing sheath on the mandrel employed in the apparatus shown in any one of FIGS. 1 and 3.

As best shown in FIG. 6, the mandrel constructed according to the present invention and shown in any one of FIGS. 1 and 2 and FIGS. 3 to 5, is in the form tapering towards its free end remote from the balance ring with its outer periphery axially extending so as to converge upon a point on the longitudinal axis of the mandrel at a predetermined angle θ of convergence. This predetermined angle θ of convergence, which is hereinafter referred to as an angle of tapering, is within the range of 0.5 to 10 degrees, preferably, within 2 to 5 degrees.

It is to be noted that the tightening force exerted by the circumferential reinforcing strands, wound on the longitudinal reinforcing strands on the mandrel, which force acts to press the longitudinal reinforcing strands tightly against the mandrel, varies depending upon the type, tension, elongation and size of each of the circumferential reinforcing strands. By way of example, where each of the circumferential reinforcing strands has a relatively high tension and a relatively high elongation, the tightening force exerted thereby is greater than that exerted by a circumferential reinforcing strand having a relatively low tension and a relatively low elongation. Therefore, where the circumferential reinforcing strands employed have a relatively high tension and a relatively high elongation, a smooth removal of the reinforcing layer from the mandrel will not be achieved unless the tightening force is relieved. Accordingly, by suitably selecting the angle of tapering θ in consideration of the tension and elongation of the circumferential reinforcing strands employed, the tightening force exerted by the circumferential reinforcing strands wound onto the longitudinal reinforcing strands can be lessened as the resultant reinforcing layer is drawn from the larger diameter end portion towards the smaller diameter end portion of the mandrel so that the reinforcing layer can subsequently be readily separated from the mandrel. The following table illustrates examples of the tapering angle θ relative to a particular type of strand.

TABLE

| TYPE OF STRAND | SIZE | TENSION | TAPERING ANGLE θ |
|---|---|---|---|
| Nylon | 1,260 dr. | 2 kg. | 2 to 4° |
| " | 1,260 dr. | 5 kg. | 4 to 6° |
| Polyester | 6,000 dr. | 5 kg. | 0.5 to 2° |
| Polyvinyl Alcohol | 1,200 dr. | 2 kg. | 1 to 3° |

It is further to be noted that, if the mandrel is of a construction having the tapering angle θ not more than 0.5°, a sufficient relief of the tightening force will not be achieved and, if it be of a construction not less than 10°, the strands forming the reinforcing layer will be displaced during the movement of the reinforcing layer on the outer peripheral surface of the mandrel and, therefore, a uniformly reinforced pressure hose cannot be available.

Figure 7:
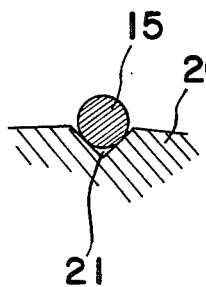
FIGS. 7 to 9 are schematic cross sectional views showing different forms of groove which may be defined on an outer peripheral surface of the mandrel.
Figure 8:
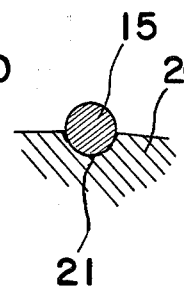
Figure 9:
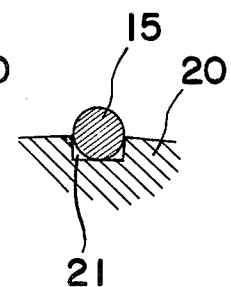

In addition, as best shown in any one of FIGS. 7 to 9, each of the guide grooves (shown by 21 in FIGS. 1 and 2 and by 49 in FIGS. 3 and 4) defined on the outer peripheral surface of the mandrel must have a depth smaller than the size of any one of the longitudinal reinforcing strands employed. If the depth of each of the guide grooves on the mandrel is equal to or greater than the size of any one of the longitudinal reinforcing strands employed, the circumferential reinforcing strands wound on the longitudinal reinforcing strands will be displaced in a direction axially of the mandrel relative to the longitudinal reinforcing strands when the reinforcing layer being formed is drawn in a direction away from the mandrel. Therefore, the depth of each of the guide grooves on the mandrel is preferably not more than one half of the size of the longitudinal reinforcing strands employed, more preferably, 1/5 to ½ of the size of the longitudinal reinforcing strands employed.

Each of the guide grooves on the mandrel may be of a type having a substantially V-shaped bottom as shown in FIG. 7, having a substantially semi-circular bottom as shown in FIG. 8, or having a substantially channel-sectioned bottom as shown in FIG. 9.

Hereinafter, the details of the tension adjusting device, which is indicated by 18 in the case of the embodiment shown in FIGS. 1 and 2 and by 18a in the case of the embodiment shown in FIGS. 3 and 4, will now be described with reference to FIGS. 10 and 11.

Figure 10:
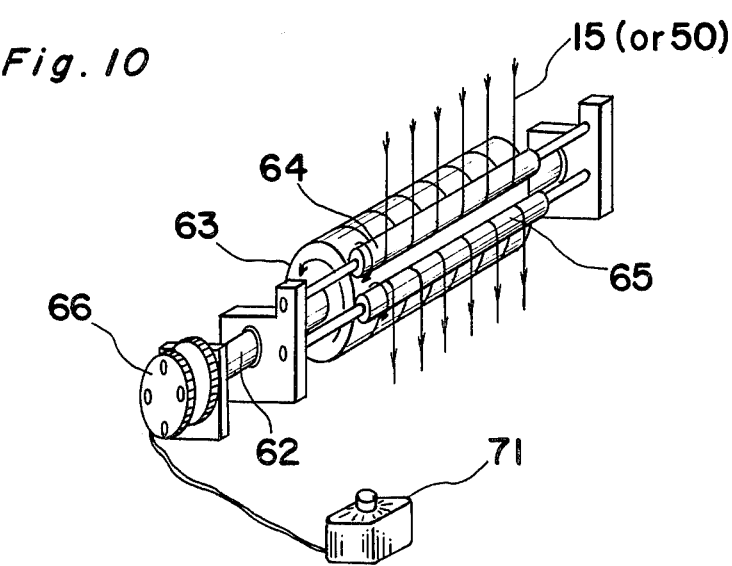
FIGS. 10 and 11 are schematic perspective views showing different forms of tension adjusting device which may be employed in the apparatus shown in any one of FIGS. 1 and 3.

Referring first to FIG. 10, the tension adjusting device comprises a pair of spaced guide rolls 64 and 65, freely rotatably supported in position by spaced bearing members forming parts of the machine framework as shown, and a drum 63 having a pair of axles outwardly extending from the opposed ends thereof, one of said axles being rotatably supported by the bearing member and the other of said axles being rotatably extending through the other bearing member as shown by 62. The tension adjusting device shown in FIG. 10 further comprises an electromagnetic brake assembly mounted on the free end of the axle 62 for applying a friction force to rotation of the drum 63.

As shown in FIG. 10, the longitudinal reinforcing strands 15 or 50 extending from their supply bobbins are first deflected by the guide roll 64, then turned around the drum 63 and finally deflected again by the guide roll 65 towards the mandrel. As the reinforcing strands 15 or 50 are drawn in the manner as hereinbefore described, the drum 63 tend to be rotated by the strands then moving. However, because of the frictional force being applied to the rotation of the drum 63 by the electromagnetic brake assembly 66, any one of the reinforcing strands undergoes a frictional movement relative to the drum 63 while rotating the latter. Therefore, it is clear that the reinforcing strands 15 or 50 can be uniformly tensioned.

In FIG. 10, reference numeral 71 represents a electric voltage regulator for the electromagnetic brake assembly 66.

Figure 11:
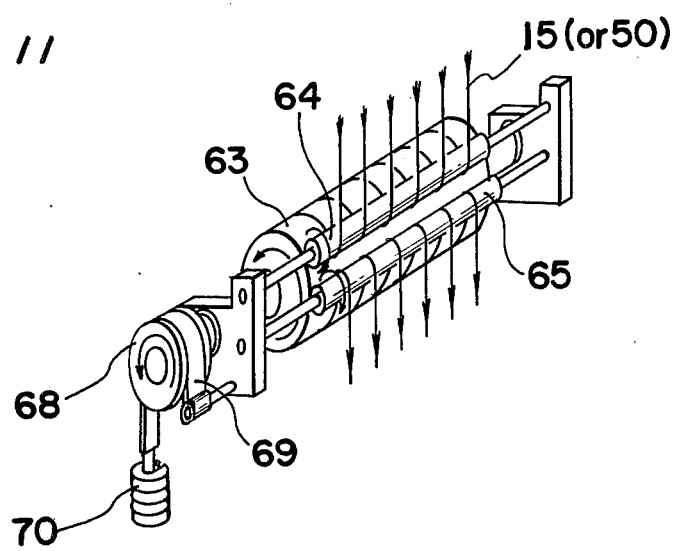

In FIG. 11, the brake assembly, which has been described as constituted by an electromagnetic brake assembly in the example shown in FIG. 10, is constituted by a pulley 68, rigidly mounted on the free end of the axle 62, and a flexible friction band 69 having one end, fixed to a stop pin secured to the bearing member as shown, and the other end adapted to receive a weight 70, a substantially intermediate portion of said band 68 being turned around the pulley 69. It will readily be seen that, by the action of the weight 70, a frictional force can be imparted to the rotation of the drum 63 in a manner substantially to that described with reference to FIG. 10. It is to be noted that, instead of the employment of the weight 70, a coil spring may be employed.

The tension to be imparted to the longitudinal reinforcing strands 15 or 50 can advantageously be controlled by suitably selecting the amount of the frictional force imparted by the brake assembly to the drum 63. In particular, this can be achieved by adjusting the voltage regulator 71 in the case where the brake assembly is of the construction as shown in FIG. 10 or by adjusting the weight 70 in the case where the brake assembly is of the construction as shown in FIG. 11.

Figure 12:
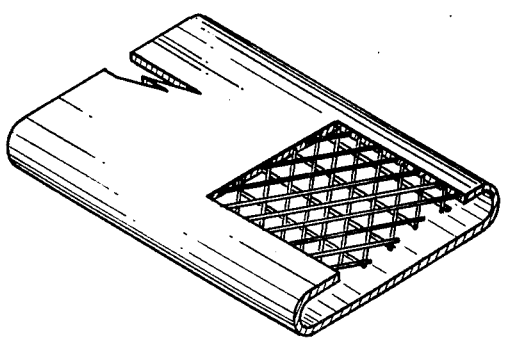
FIGS. 12 and 13 are schematic perspective views, with a portion broken away, showing two types of fiber-reinforced pressure hose which can be manufactured with the apparatus shown in any one of FIGS. 1 and 3.
Figure 13:
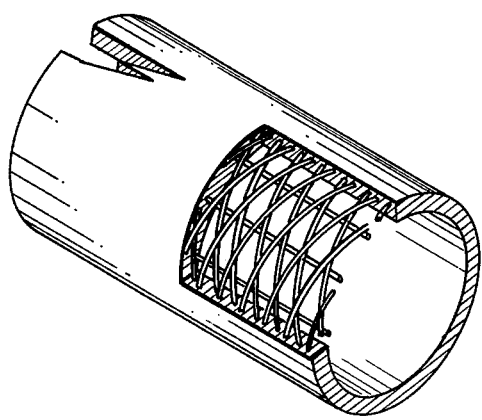

While the apparatus according to the present invention has fully been described, it is to be noted that the method according to the present invention can manufacture the fiber-reinforced pressure hose of a construction such as shown in any one of FIGS. 12 and 13. Shown in FIG. 12 is a flatened pressure hose while shown in FIG. 13 is a pressure hose of substantially circular cross-section. In any event, irrespective of the type of hose shown in FIG. 12 or FIG. 13, the present invention is featured by the fact that, because of the particular construction of the mandrel, the hose with the reinforcing layer embedded therein can be continuously manufactured at a relatively high speed with a relatively small drawing force required to draw the hose being manufactured.

Although the present invention has fully been described in conjunction with the preferred embodiments thereof, it is to be noted that various changes and modifications are apparent to those skilled in the art. For example, in the present invention, a braider machine as means for winding the circumferential reinforcing strands on the mandrel spirally may be substantially used instead of the above spiral winder.

Accordingly, such changes and modifications are, unless they depart from the true scope of the present invention, to be understood as included therein.

What is claimed is:

1. A method of manufacturing a fiberreinforced pressure hose, which comprises the steps of:
   forming a reinforcing layer on an elongated mandrel of a construction which has a first and second end and an outer peripheral surface formed with a plurality of guide grooves extending lengthwise of said mandrel, said mandrel being of substantially truncated conical shape tapering from said first end towards said second end thereof at a predetermined angle of convergence, the formation of the reinforcing layer being carried out by guiding a plurality of longitudinal reinforcing strands along the guide grooves on the mandrel in one direction while at least two circumferential reinforcing strands are wound on the longitudinal reinforcing strands on a section of the mandrel intermediate said first and second ends thereof and spirally in opposed direction to each other;
   drawing the reinforcing layer outwards from said second end of said mandrel; and
   supplying a resinous material to the reinforcing layer at a position outside of and longitudinally spaced from said mandrel to form a tubular product with the reinforcing layer embedded therein while the reinforcing layer being formed is continuously drawn away from the mandrel.

2. A method as claimed in claim 1, wherein the predetermined angle of convergence is within the range of 0.5° to 10°.

3. A method as claimed in claim 2, wherein the depth of each of the guide grooves on the mandrel is within the range of 1/5 to ½ of the size of any one of the longitudinal reinforcing strands employed.

4. A method as claimed in claim 3, wherein the formation of the tubular product is carried out by supplying the resinous material externally of the reinforcing layer.

5. A method as claimed in claim 3, wherein the formation of the tubular product is carried out by supplying the resinous material internally of the reinforcing layer.

6. A method as claimed in claim 3, wherein the formation of the tubular product is carried out by passing a previously manufactured tube member through an axial bore in the mandrel coaxial with the reinforcing layer and, then, supplying the resinous material onto the outer peripheral surface of the previously manufactured tube member with the reinforcing layer positioned between the outer peripheral surface of the previously manufactured tube member and the resinous material being supplied.

7. A method as claimed in claim 2, wherein the formation of the tubular product is carried out by supplying the resinous material externally of the reinforcing layer.

8. A method as claimed in claim 2, wherein the formation of the tubular product is carried out by supplying the resinous material internally of the reinforcing layer.

9. A method as claimed in claim 2, wherein the formation of the tubular product is carried out by passing a previously manufactured tube member through an axial bore in the mandrel coaxial with the reinforcing layer and, then, supplying the resinous material onto the outer peripheral surface of the previously manufactured tube member with the reinforcing layer positioned between the outer peripheral surface of the previously manufactured tube member and the resinous material being supplied.

10. A method as claimed in claim 1, wherein the depth of each of the guide grooves on the mandrel is within the range of 1/5 to ½ of the size of any one of the longitudinal reinforcing strands employed.

11. A method as claimed in claim 10, wherein the formation of the tubular product is carried out by supplying the resinous material externally of the reinforcing layer.

12. A method as claimed in claim 10, wherein the formation of the tubular product is carried out by supplying the resinous material internally of the reinforcing layer.

13. A method as claimed in claim 10, wherein the formation of the tubular product is carried out by passing a previously manufactured tube member through an axial bore in the mandrel coaxial with the reinforcing layer and, then, supplying the resinous material onto the outer peripheral surface of the previously manufactured tube member with the reinforcing layer positioned between the outer peripheral surface of the previously manufactured tube member and the resinous material being supplied.

14. A method as claimed in claim 1, wherein the formation of the tubular product is carried out by supplying the resinous material externally of the reinforcing layer.

15. A method as claimed in claim 1, wherein the formation of the tubular product is carried out by supplying the resinous material internally of the reinforcing layer.

16. A method as claimed in claim 1, wherein the formation of the tubular product is carried out by passing a previously manufactured tube member through an axial bore in the mandrel coaxial with the reinforcing layer and, then, supplying the resinous material onto the outer peripheral surface of the previously manufactured tube member with the reinforcing layer positioned between the outer peripheral surface of the previously manufactured tube member and the resinous material being supplied.

17. A method as claimed in claim 16, wherein the resinous material is at least one tape of resinous material wound on the tube member with the reinforcing layer positioned between said tube member and said resinous tape.

18. A method as claimed in claim 16, wherein the reinforcing layer is bonded by a bonding agent to the outer peripheral surface of the tube member prior to the resinous material being supplied onto said tube member.

19. A method as claimed in claim 1, wherein the longitudinal reinforcing strands are uniformly tensioned by passing them around a rotatably supported drum, said drum being rotated by the longitudinal reinforcing strands being moved, and applying a frictional force to the rotation of the drum to regulate the tension of any one of the longitudinal reinforcing strands being passed around the drum.

20. An apparatus for manufacturing a fiber-reinforced pressure hose, which comprises, in combination:
- an elongated mandrel having first and second ends and an outer peripheral surface formed with a plurality of guide grooves extending lengthwise of said mandrel, said mandrel being of a substantially truncated conical shape tapering from said first end toward said second end thereof at an angle of convergence within the range of 0.5° to 10°;
- a balance ring rigidly positioned to said first end of said mandrel and having a plurality of axial holes for guiding longitudinal reinforcing strands into the grooves of the mandrel;
- means for winding at least two circumferential reinforcing strands on the longitudinal reinforcing strands on a section of said mandrel intermediate said first and second ends thereof and spirally in opposed directions to each other to form a substantially tubular reinforcing layer;
- means for supplying a resinous material in a molten state toward said second end of the mandrel;
- means defining an annular orifice for forming a tubular product from said resinous material with the reinforcing layer embedded therein, said annular orifice being disposed outside of and longitudinally spaced from said mandrel; and
- means for drawing the tubular product being so manufactured.

21. An apparatus as claimed in claim 20, further comprising a tension adjusting device including a driven drum, driven by the longitudinal reinforcing strands being moved, and a brake assembly for applying a frictional force to the rotation of the drum.

22. An apparatus as claimed in claim 21, wherein said brake assembly is constituted by an electromagnetic brake assembly.

23. An apparatus as claimed in claim 21, wherein said brake assembly is constituted by a band brake assembly.

24. An apparatus for manufacturing a fiber-reinforced pressure hose, which comprises, in combination:
- an elongate mandrel having first and second ends and an outer peripheral surface formed with a plurality of guide grooves extending lengthwise of said mandrel, said mandrel being of a substantially truncated conical shape tapering from said first end towards said second end thereof at an angle of convergence within the range of 0.5° to 10°;
- a balance ring rigidly connected to said first end of the mandrel and having a plurality of axial holes for guiding longitudinal reinforcing strands into the grooves of the mandrel;
- means for winding at least two circumferential reinforcing strands on the longitudinal reinforcing strands on a section of said mandrel intermediate said first and second ends thereof and spirally in opposed directions to each other to form a substantially tubular reinforcing layer;
- means defining an annular orifice for forming a tubular product, said annular orifice being disposed outside of and longitudinally spaced from said mandrel; and
- means for drawing the wound circumferential and longitudinal strands onto the outer periphery of said tubular product and for drawing the tubular product having the reinforcing layer mounted on the outer periphery thereof away from said forming means.

25. An apparatus as claimed in claim 24, further comprising a tension adjusting device including a driven drum, driven by the longitudinal reinforcing strands being moved, and a brake assembly for applying a frictional force to the rotation of the drum.

26. An apparatus as claimed in claim 25, wherein said brake assembly is constituted by an electromagnetic brake assembly.

27. An apparatus as claimed in claim 25, wherein said brake assembly is constituted by a band brake assembly.

* * * * *